J. BARBERIE & T. J. WALSH.
SAFETY APPARATUS FOR MOTOR CARS.
APPLICATION FILED SEPT. 24, 1904. RENEWED OCT. 9, 1905.
927,475.
Patented July 13, 1909.
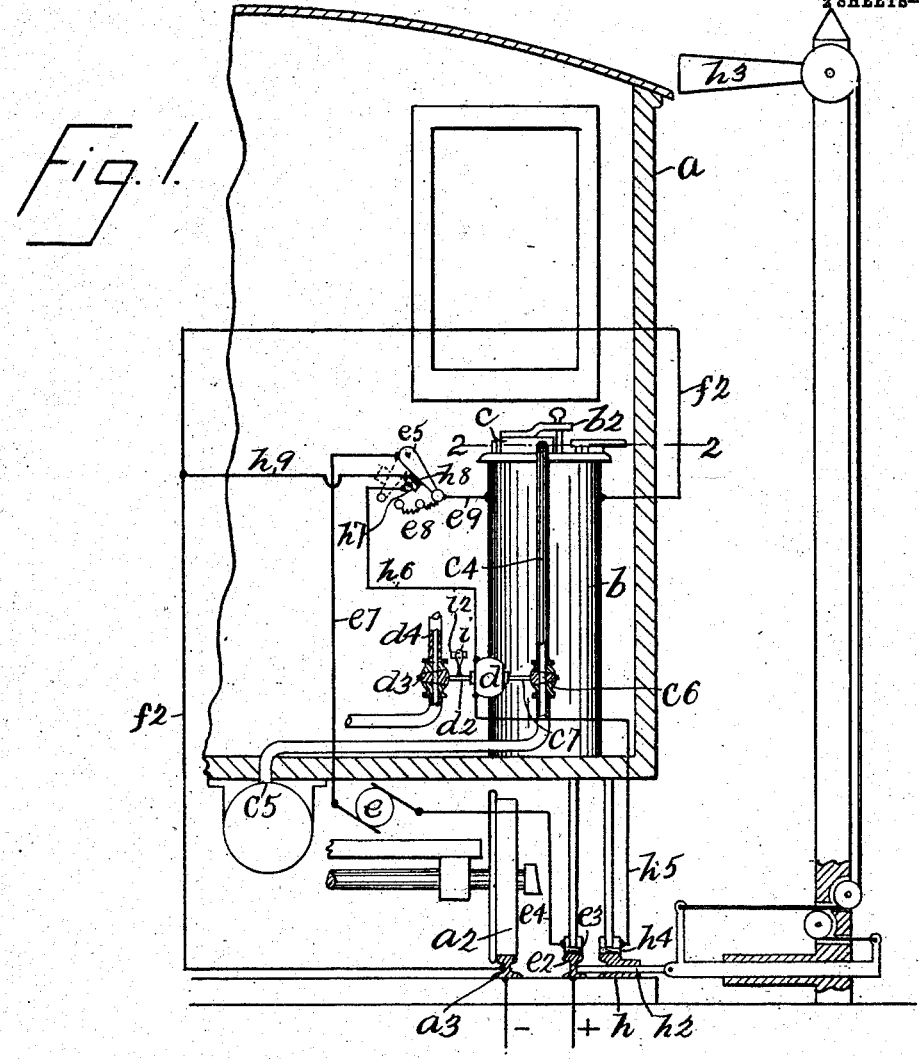
WITNESSES
INVENTORS
John Barberie
Thomas J. Walsh
BY
ATTORNEY

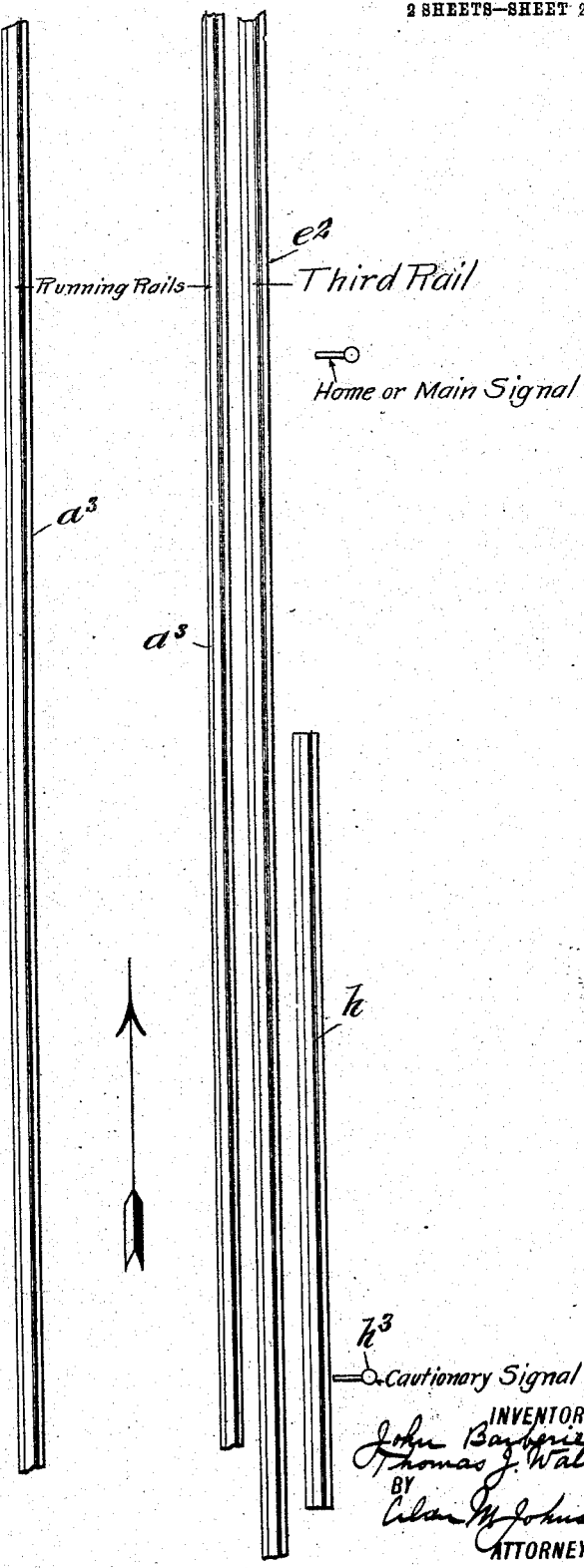

UNITED STATES PATENT OFFICE.

JOHN BARBERIE AND THOMAS J. WALSH, OF BROOKLYN, NEW YORK, ASSIGNORS TO BARBERIE LOCOMOTIVE APPLIANCE COMPANY, OF NEW YORK, N. Y., A CORPORATION OF NEW YORK.

SAFETY APPARATUS FOR MOTOR-CARS.

No. 927,475.  Specification of Letters Patent.  Patented July 13, 1909.

Application filed September 24, 1904, Serial No. 225,762. Renewed October 9, 1905. Serial No. 282,018.

*To all whom it may concern:*

Be it known that we, JOHN BARBERIE and THOMAS J. WALSH, citizens of the United States of America, and residing at Brooklyn, in the county of Kings and State of New York, have invented certain new and useful Improvements in Safety Apparatus for Motor-Cars, of which the following is a specification, such as will enable those skilled in the art to which it appertains to make and use the same.

The object of this invention is to provide a safety apparatus for motor cars whereby, if a signal be set and the motorman fails to see the same, the electric power of said car may be automatically shut off, the brakes set and the car brought to a stand still; a further object of this invention being to provide such an apparatus whereby the motorman, if he so desires, may pass the set signal but in so doing must cut off the motive power of said car while passing the signal and a still further object being to provide an apparatus of this class which is simple and effective in operation and construction and comparatively inexpensive.

Our invention is fully described in the following specification of which the accompanying drawings form a part, in which the separate parts thereof are designated by suitable reference characters in each of the views, and in which:—

Figure 1 is a partial end view of a motor car provided with our apparatus and the electrical circuits of which are diagrammatically represented; and Fig. 2, a section on the line 2—2 of Fig. 1. Fig. 3 is a plan view of the running and third rails and any form of cautionary signal and home or main signal.

In the drawings forming part of this specification, we have shown a portion of the interior of a motor car $a$, mounted on wheels $a^2$, only one of which is shown, and said wheel moving on a track or rail $a^3$ and the car $a$ is provided with the usual controller box $b$ provided with a handle $b^2$ and, in practice, the handle $b^2$ is mounted upon a casing $c$ within which is pivoted a plate $c^2$ of the same size as the inner surfaces of said casing and free to move therein upon its pivot $c^3$ and the controller handle is secured to the pivot $c^3$ and therefore moves with the plate $c^2$ and connected with one end of the casing $c$ and adjacent to the normal position of the plate $c^2$ is a pipe $c^4$ connected with the main reservoir of the compressed air supply as shown at $c^5$ and the pipe $c^4$ is provided with a valve $c^6$ normally closed and said valve is provided with a stem $c^7$.

As shown in Fig. 1, the valve stem $c^7$ is in operative connection with a motor $d$ and also in connection with said motor is a stem $d^2$ of a valve $d^3$ mounted in a pipe $d^4$, said pipe being the train line pipe of the air brake system and the valve $d^3$ is also normally closed and, as will be seen, when the motor $d$ is energized, the valves $c^6$ and $d^3$ are opened, the stems thereof being provided with stops or other suitable devices for limiting the operation of the motor $d$ to 90 degrees, and the compressed air from the reservoir $c^5$ passes to the casing $c$ and the plate $c^2$ is forced outwardly as well as the controller handle $b^2$ and the motive power to the main motor $e$ is therefore shut off and at the same time the air in the train line pipe $d^4$ is permitted to escape and the brakes are set thereby.

At $e^2$ we have indicated the usual third-rail of an electric railway system and with which a shoe $e^3$ is adapted to operate, said shoe being in electrical connection with the motor $e$ by means of a wire $e^4$ and connected with the other side of said motor $e$, and with a switch $e^5$ is a wire $e^7$ and the extreme outer contact of a rheostat $e^8$ upon which the switch $e^5$ operates, is connected with the controller box $b$ by means of a wire $e^9$ and the other side of said controller $b$ is connected with the ground rail $a^3$ by means of a wire $f^2$ and it will therefore be seen that when the rail $e^2$ is energized, the current passes through the motor $e$, switch $e^5$, controller $b$ and ground rail $a^3$ and is controlled by means of the handle $b^2$ in the usual manner.

Adjacent to the third-rail $e^2$, and parallel thereto is a rail $h$, which is not continuous but of a length great enough to suit the requirements of the road upon which our apparatus is used and passing therethrough is a slide bar $h^2$ operated by means of a semaphore or other signal $h^3$ to slide toward the third-rail $e^2$ when the said signal is set at the danger point and the slide bar $h^2$ is composed of conductive material and, when in contact with the third-rail $e^2$ said supplemental rail $h$ is in electrical communication with said third rail and ready to be energized when a circuit is completed therethrough or if the said rail $h$ be grounded and mounted upon the car $a$ is a supplemental shoe $h^4$ adapted to slide upon the rail $h$, as clearly shown in Fig. 1.

At any convenient place on the car $a$ is a supplemental motor $d$ already described and said motor $d$ is connected with the supplemental shoe $h^4$ by a wire $h^5$ and connected with the other side of said motor $d$ is a wire $h^6$ the other end of which is connected with a contact $h^7$ adjacent to the switch $e^5$ and carried by said switch but insulated therefrom is a plate $h^8$ which is normally in connection with the contact $h^7$ and a wire $h^9$ connects said plate $h^8$ with the wire $f^2$ or grounded in any other suitable manner. It will therefore be seen that when the third rail $e^2$ is energized, the motor $e$ is operated and the car moves, but only when the switch $e^5$ is in its normal position as shown in full lines and when the slide bar $h^2$ is out of contact with the third-rail $e^2$ and if the signal $h^3$ be set at the danger point the slide-bar is forced toward the third-rail $e^2$ and touches the same and the current passes through the shoe $h^4$, wire $h^5$, motor $d$, wire $h^6$, contact $h^7$, plate $h^8$, wire $h^9$, wire $f^2$ and return rail $a^3$ and the motor $d$ is actuated and the valves $c^6$ and $d^3$ are operated into the positions shown in the drawing and the compressed air from the reservoir $c^5$, as previously described, shuts off the motive power and the brakes of the car are set by the air escaping from the pipe $d^4$ and the car is brought to a standstill. If, however, the motorman for any reason desires to pass the signal while he is under way, he operates the switch $e^5$ to the position indicated in dotted lines in Fig. 1, at which time he breaks the connection between the plate $h^8$ and contact $h^7$, but at the same time cuts out the main circuit and thereby reduces the speed of the motor $e$ and the car gradually stops, the brakes not having been set by this operation and, upon returning the switch $e^5$ to its normal position, the main circuit is again completed and if he has at this time passed the section or block of the supplemental rail $h$, or if the signal be returned to the safety position, the motor $d$ is deënergized and the valves $c^6$ and $d^3$ may be returned to their normal positions by means of a handle $i$ which has been forced against the stop $i^2$ by the operation of the motor $d$ and the apparatus is ready for use with another rail $h$ and signal $h^3$.

In practice, we prefer to connect our track apparatus with the usual or any desired cautionary signal placed at some distance from the home or main signal, the object being that, if the motorman fails to see the cautionary signal when set at danger, the car is stopped automatically and warns him to proceed with care, for, if no cautionary signal were employed and he passed the home signal without seeing the same, the impetus of the car would carry it for some distance beyond the signal and perhaps result in accident.

Although we have shown our apparatus connected with the third-rail system, it will be obvious that the same may be easily adapted for the trolley system and we prefer to so arrange our apparatus that, where motor cars change from one system to the other as is frequently done, the result desired will be accomplished with either system, it being necessary, however, to employ the track apparatus shown or other similar devices, and various other changes in and modifications of the construction herein shown and described may be made without departing from the spirit of our invention or sacrificing its advantages, and with this reservation,

What we claim as new and desire to secure by Letters Patent, is:—

1. In a motor car provided with a motor, a feed conductor, a return conductor, an air reservoir and air brakes; devices arranged in an incomplete electrical circuit and in operative connection with said reservoir, air brakes and motor and external means connected with a signal for completing said circuit.

2. In a motor car provided with a motor, air reservoir and air brakes; an electrical device in operative connection with said motor, air reservoir and air brakes and external means connected with a signal for energizing said electrical device and thereby deënergize said motor and set said air brakes.

3. In a safety apparatus for motor cars, a motor, a feed conductor, a return conductor, a controller, an air reservoir, air-brakes, a controller handle, a plate on said handle and beneath the same, a casing about said plate, a pipe communicating said reservoir with said casing, a valve in said pipe and means connected with an external signal for operating said valve and thereby said plate and controller handle.

4. In a motor car comprising the usual motor, feed conductor, return conductor, controller, handle therefor, air brakes and reservoir therefor; a train line pipe, a valve therein, a plate on said controller handle, a casing about said plate, a pipe connecting said reservoir with said casing, a valve therein, a supplemental motor for operating said valves and means connected with an external signal for energizing said supplemental motor when said signal is set.

5. In a motor car, a motor, a feed conductor, a return conductor, air brakes, a supplemental switch, a supplemental motor, said motor being in operative connection with said air brakes, and means connected with an external signal for energizing said supplemental motor and operating said air brakes.

6. In a safety apparatus for motor cars, a motor, a feed conductor, a return conductor, a controller, a conducting member adjacent to said feed conductor, electrical conductors connecting said member with said return conductor and means connected with an external signal for electrically connecting said member with said feed conductor.

7. In a safety apparatus for motor cars, a motor, a feed conductor, a return conductor, air brakes, a supplemental motor, a conducting member adjacent to said feed conductor, electrical conductors connecting said member with said return conductor, devices for connecting said member with said feed conductor, said devices being connected with an external signal and said supplemental motor being in operative connection with said air brakes of said car, and a switch for preventing the operation of said supplemental motor, said switch serving also to deënergize said first named motor.

8. In a safety apparatus for motor cars, a motor, a feed conductor, a return conductor, a supplemental motor, a train line pipe, a valve therein and in operative connection with said supplemental motor, external devices for energizing said supplemental motor and means for deënergizing said supplemental motor, when energized, said means serving also to deënergize said first named motor.

9. In a safety apparatus for motor cars, a motor, an electrical circuit in connection therewith, air brakes, a supplemental electrical circuit in operative connection with said air brakes, external devices for making and breaking said last named circuit and means on said car for breaking both of said circuits simultaneously.

10. In a safety apparatus for motor cars, a motor, an electrical circuit in connection therewith, a train line pipe, a valve therein adapted to be electrically operated by external means, means for preventing the operation of said valve, said means when operated serving also to break said first named circuit.

11. In a safety apparatus for motor cars, a motor, motive power for same, a train line air brake pipe, a valve therein adapted to be electrically operated by external means, means for preventing the operation of said valve, said means when operated serving also to shut off said motive power.

12. The combination with an electrically propelled car, a safety device carried by the car, a track circuit located along a portion of the line of way and adapted under certain conditions to operate the safety device carried by the car, and means insuring the car passing over said portion of the line of way at controlled or reduced speed in order to prevent the track circuit operating the safety device carried by the car, thereby permitting the car to lessen the distance between itself and a car immediately ahead of it.

13. The combination with a car provided with means for its electrical propulsion, a safety device carried by the car, a track circuit mounted along the line of way for operating the safety device under certain conditions, and means permitting the car to pass under control, the track circuit along the line of way, to permit the car to lessen the distance between it and the car in the block immediately ahead of it.

14. The combination with a car provided with a motor for propelling it, an electrical control to supply motive power to the motor, a safety apparatus carried by the car which when in its operative condition is adapted to set the brakes, and means on the car for placing the safety apparatus into its inoperative condition to avoid setting the brakes.

15. In a safety apparatus for motor cars, a motor, an electrical circuit in connection therewith, a train line pipe, a valve therein adapted to be operated by external means, means for preventing the operation of said valve, said means when operated serving also to break said first named circuit.

16. In a safety apparatus for motor cars, a motor, motive power for same, a train line air-brake pipe, a valve therein adapted to be electrically operated by external means, means for preventing the operation of said valve, said means when operated serving also to shut off said motive power.

17. The combination with a car provided with means for electrical propulsion, a safety device carried by the car, external devices arranged along the line of way adapted to operate said safety device and means on the car for controlling the operation of said safety device while passing said external devices.

18. The combination with a car provided with means for its electrical propulsion, a manually operated control handle to control the supply of power to the car, a safety apparatus carried by the car adapted to apply the brakes when actuated by the devices along the line of way, actuating devices along the line of way, means on the car for controlling the application of the brakes while passing the actuating devices and for preventing the manual operation of said control handle from controlling the supply of power to the car.

19. In a safety apparatus for motor cars, a safety device carried by the car adapted to be operated by an external signaling device, an external signaling device, and means for controlling the speed of the car while coöperating with the signaling device.

20. In a safety apparatus for motor cars, a safety device carried by the car, a train stop device along the line of way adapted to operate the safety apparatus at some distance from the home or main signal, and means to reduce the speed of the car over a portion of the line of way before the car reaches the home signal.

21. The combination with an electrically propelled car provided with a motor for propelling it, a safety apparatus carried by the car and adapted to operate the brakes, a track device for operating the safety apparatus, and means for permitting the car to pass the track device under the control of the motorman.

22. The combination with a car provided with means for its electrical propulsion, a safety device carried by the car, means mounted along the line of way for operating the safety device under certain conditions, and means permitting the car to pass under control the operating means along the line of way to permit the car to lessen the distance between it and the car in the block immediately ahead of it.

23. In a safety apparatus for motor cars, a safety device carried by the car, a cautionary signal located in advance of the home or main signal, a home or main signal, a train stop device located along the line of way and approximately adjacent to the cautionary signal, and means to permit the car to pass said cautionary signal and train stop device under control and without applying the brakes to permit the car to approach another car in the block ahead.

24. The combination with a car provided with a motor for propelling it, an electrical control for the supply of motive power to the motor, a safety apparatus carried by the car and having an operative and inoperative position, and means for moving the safety apparatus from one of its positions to the other and for interrupting the electrical control of the motive power.

In testimony that we claim the foregoing as our invention we have signed our names in presence of the subscribing witnesses this 23rd day of September 1904.

JOHN BARBERIE.
THOMAS J. WALSH.

Witnesses:
CHARLES A. GRIFFITH,
JOHN CUNNINGHAM.